US010581847B1

(12) United States Patent
Sun et al.

(10) Patent No.: US 10,581,847 B1
(45) Date of Patent: Mar. 3, 2020

(54) BLOCKCHAIN-BACKED DEVICE AND USER PROVISIONING

(71) Applicant: Amazon Technologies, Inc., Seattle, WA (US)

(72) Inventors: Nicholas Sun, Mercer Island, WA (US); Damian Finol Correa, Seattle, WA (US); Yunlong Liu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 257 days.

(21) Appl. No.: 15/277,972

(22) Filed: Sep. 27, 2016

(51) Int. Cl.
*H04L 29/06* (2006.01)
(52) U.S. Cl.
CPC ........ *H04L 63/0876* (2013.01); *H04L 63/102* (2013.01)
(58) Field of Classification Search
CPC combination set(s) only.
See application file for complete search history.

(56) References Cited

U.S. PATENT DOCUMENTS

| | | | | |
|---|---|---|---|---|
| 2008/0229098 A1* | 9/2008 | Ishak | ...................... | G06F 21/31 713/156 |
| 2015/0095999 A1* | 4/2015 | Toth | ........................ | H04L 63/08 726/6 |
| 2015/0339659 A1* | 11/2015 | Ballesteros | ........ | G06Q 20/3229 705/76 |
| 2016/0342976 A1* | 11/2016 | Davis | .................. | G06Q 20/3829 |
| 2017/0046689 A1* | 2/2017 | Lohe | .................... | G06F 12/1408 |
| 2017/0046698 A1* | 2/2017 | Haldenby | .......... | G06Q 20/0655 |
| 2017/0155515 A1* | 6/2017 | Androulaki | ............. | G06F 21/64 |
| 2017/0178127 A1* | 6/2017 | Kravitz | ............ | G06Q 20/38215 |
| 2017/0243209 A1* | 8/2017 | Johnsrud | ................ | G06Q 20/40 |
| 2018/0063189 A1* | 3/2018 | Versteeg | ............ | H04L 63/1466 |

OTHER PUBLICATIONS

Christidis et al, "Blockchains and Smart Contracts for the Internet of Things," IEEE Access Year: 2016 | vol. 4 | Journal Article | Publisher: IEEE cited by: Papers (609).*
Nath, Indranil, "Data Exchange Platform to Fight Insurance Fraud on Blockchain," 2016 IEEE 16th International Conference on Data Mining Workshops (ICDMW) Year: 2016 | Conference Paper | Publisher: IEEE Cited by: Papers (8).*

* cited by examiner

*Primary Examiner* — Roderick Tolentino
(74) *Attorney, Agent, or Firm* — Davis Wright Tremaine LLP

(57) ABSTRACT

A blockchain is used to track chain of custody associated with devices and user entities associated with those devices. In an embodiment, an identity engine traverses a blockchain to determine one or more transactions associated with a device and, in some cases, one or more users of that device. Based at least in part on the content of an authentication or provisioning request and that of the chain of custody, the identity engine provisions the device for a given user.

20 Claims, 10 Drawing Sheets

BLOCKCHAIN-BACKED DEVICE AND USER PROVISIONING

BACKGROUND

Distributed computing and storage systems and services, such as those provided by computing resource service providers (e.g., over the Internet), are increasingly utilized by enterprises and individual users to augment, and in some cases, replace on-premise computing resources, as well as to track assets, such as devices. However, as such distributed systems and services are not necessarily under complete control of the implementing user or enterprise, the integrity of transactions made therewith can be difficult to ascertain (from the perspective of the user), and difficult for which to provide assurances (from the perspective of the service provider).

For example, an entity may wish to control device and/or user access to a network, as well as a user's access to the specific devices. In such scenarios, a cryptographically backed chain of custody or other cryptographic method for ascertaining the identity of the connecting users and/or devices may be implemented. However, it can be difficult to detect attackers in a diffuse environment where a given, legitimate user may use one of many devices to connect to the network, and similarly, where any given legitimate device may be authorized to authenticate many different users.

BRIEF DESCRIPTION OF THE DRAWINGS

Various techniques will be described with reference to the drawings, in which.

DETAILED DESCRIPTION

Figure 1:
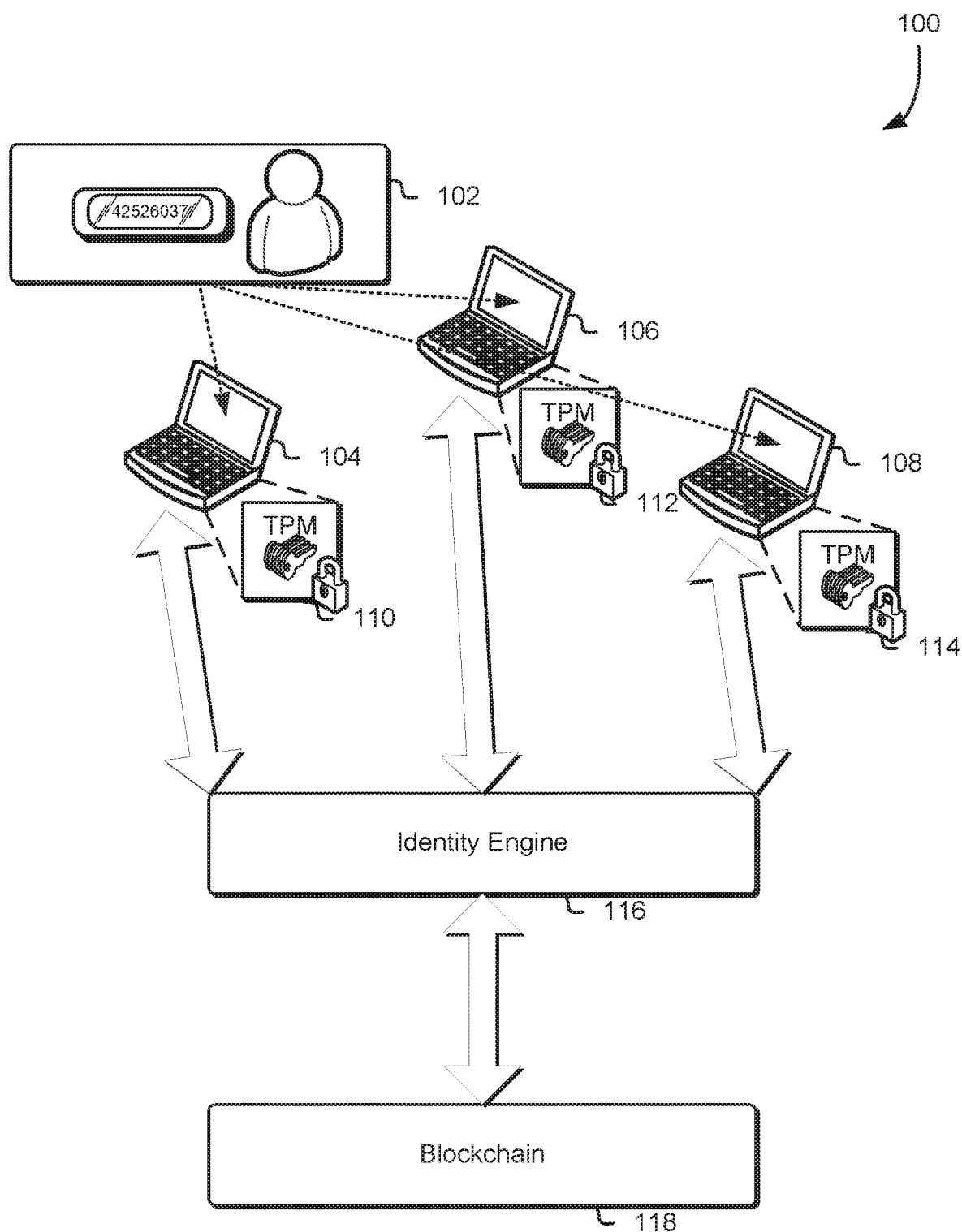
FIG. 1 illustrates an example environment where an agent or other user entity attempts to authenticate with a pool of devices, for which authentication is controlled using a blockchain-backed identity engine, in accordance with some embodiments.

In one example, an identity engine provides a centralized verification and provisioning service for a pool of devices that can be provisioned, on a many-to-many basis, to a pool of users. For example, the devices may be fungible in the sense that a given user entity may log in to an arbitrarily different device at different times, in some cases to perform similar operations. The user entities may be provided with login credentials, which may be single factor (e.g., user login and password) or multifactor (e.g., a cryptographic token or other unrelated authentication credential also being required, along with a user login and password), to be passed to the devices for local authentication (or, alternatively, remote authentication, e.g., by a third party authentication service).

The result of the user entity's attempt at authentication may be handled in a number of ways. For example, if the authentication attempt fails, the result may simply be discarded, or the faulty credentials used may be recorded and/or the outcome may be sent to the identity engine for recording. To the extent that the local authentication of the login credentials (and thus the user identity associated with them) is successful, further action may be taken to validate the authenticated identity, the device to which the user entity desires to be associated, and the like. For example, the identity engine may only provision a given device in a pool of devices for a specific user, such as the authenticated user, at any given time. Likewise, a user may only be authorized to provision one device at any given time. As may be appreciated, the movements of users between devices may be difficult to track in a strong way unless an immutable, auditable manner for the specific credentials associated with the user identities, devices, etc. to be persisted is implemented.

Accordingly, the identity engine may implement a blockchain or similar cryptographically verifiable ledger to track credentials, such as cryptographic data, associated with users, devices, and the identity engine itself, over time. For example, the identity engine may record, as transactions in the blockchain, successful authentication attempts, failed authentication attempts, valid credentials for some or all of the involved entities over a period of time, rotations and/or other changes of such credentials, and the like. From this information, given that the credentials may be tracked to the entities to which they are associated, a chain of custody may be determined for any given device, as well as an audit trail for users of the devices. This chain of custody may be used to determine whether a given device may be provisioned to a requesting authenticating user, as well as to determine the usage, rotation, and authentication history of the various entities.

For example, if the device-local authentication of the login credentials are valid, an encrypted communication channel (e.g., using TLS/SSL) is established between the device and the identity engine, where the identity engine provides its own credentials to provide attestation as to its authority. The device generates and provides credentials similarly providing an attestation as to its identity (e.g., device credentials, such as the public certificate of an asymmetric cryptographic pair), as well as "wallet" credentials (e.g., user credentials, again, such as the public certificate of an asymmetric cryptographic pair). The "wallet" or user credentials may be derived from the login credentials of the authenticated user or otherwise associated with the user at one or both the local device or the identity engine.

The identity engine verifies the various credentials received from the device by at least generating a chain of custody from the blockchain records related to that device to determine if, for example, another user has already provisioned the same device (indicating that the requesting device has been spoofed), if any of the accompanying credentials have expired (e.g., rotated out), and the like. Other forensics and heuristics may be utilized by the identity engine to determine whether to grant the request and provision the device to the requesting user.

As mentioned, the credentials may be rotated, e.g., at a predetermined interval or other time schedule, or they may be changed in response to an event or request (e.g., changed with each successful authentication, if a new identity is requested, and the like). When the credentials are rotated, the identity engine may record the credential changes in the blockchain. For example, a transaction may be recorded in the blockchain that includes an identification of the previous device credential, the new device credential, and the user credential associated with the then-authenticated user.

It may be contemplated that the blockchain itself may be exposed, e.g., through a programmatic or user interface, for inspection by any requesting auditing entity, such as an administrator associated with the devices. Additionally, the credentials associated with the identity engine itself may be rotated, revoked, etc., so as to disable provisioning of any devices reliant thereupon (e.g., by refusing connection with the identity engine in the first instance).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where an agent or other user entity attempts to authenticate with a pool of devices, for which authentication is controlled using a blockchain-backed identity engine, in accordance with some embodiments.

In some embodiments, a plurality of devices 104, 106, 108 is available to a given user identity 102, which may be associated with a user entity 102 (e.g., a customer of a computing resource service provider, an agent thereof, etc.). The devices 104, 106, 108 may be homogenous or heterogeneous, and may include any device having a cryptoprocessor and, in some embodiments, the device(s) may be capable of connecting with a network and thereon to an identity engine 116, such as an identity engine 116 implemented by a computing resource service provider. For example, the devices may be Internet- or network-enabled appliances, sensors, computers (e.g., laptops or desktop computers), mobile devices (e.g., smart phones, tablets, smart watches, and the like), servers, virtual machines (e.g., as provided by a computing resource service provider, such as via a service of the computing resource service provider, and the like. As mentioned, the devices may be fungible in the sense that a given user entity may log in to an arbitrarily different device at different times, in some cases to perform similar operations.

As mentioned, the devices include or have access to one or more cryptoprocessors 110 112, 114 capable of calculating, storing, and providing cryptographic information. Such cryptoprocessors may include software or firmware routines executing on the device, application-specific integrated circuits, facilities built into general central processing units (e.g., cryptographic routines and instructions available to software, hardware, and/or firmware running on the device), trusted platform modules (TPMs), hardware security modules (HSMs), and the like. As another example, the cryptoprocessors may be provided by a third party entity, such as a cryptography service provided by a computing resource service provider (described in further detail in connection with FIG. 9 below), and connected to the device(s) 104, 106, 108 rather than integrated with them as illustrated. As mentioned, the devices 104, 106, 108 may be homogenous or heterogeneous, and may be provided with cryptographic material from heterogeneous sources (e.g., some devices may utilize a TPM, others may use a cryptographic service, yet others may use a network-connected HSM, etc.).

The user entity 102 attempts to authenticate with a specific device of the pool of devices 104, 106, 108 using its login credentials. The login credentials may be single factor (e.g., user login and password) or multifactor (e.g., a cryptographic token or other unrelated authentication credential also being required, along with a user login and password). In some embodiments, the device in question processes the presented login credentials to determine whether they are valid. Alternatively, the device passes the login credentials to a third party authentication service, such as one provided to the device(s) by a computing resource service provider.

To the extent that the local authentication of the login credentials (and thus the user entity/identity 102 associated with them) is successful, further action by, e.g., an identity engine 116, may be taken to validate the authenticated identity, the device to which the user entity desires to be associated, and the like. The identity engine 116 may be any computational, networked entity, e.g., implemented by a computing resource service provider, and may include virtual machines, hardware server computers, and the like, and/or may be implemented as a software routine executing on such computational resources. The identity engine 116 may connect with the devices 104, 106, 108 via one or more networks, such as the Internet.

In some embodiments, the identity engine 116 provides a centralized verification and provisioning service for the pool of devices 110, 112, 114, and makes decisions regarding provision of devices to users (and in some cases, vice versa). The result of the user entity's attempt at authentication may be handled in a number of ways. For example, if the authentication attempt fails, the result may simply be discarded, or the faulty credentials used may be recorded and/or the outcome may be sent to the identity engine for recording.

The identity engine 116 may enforce one or more policies associated with the devices 104, 106, 108. For example, the identity engine 116 may be authorized to only provision a single device from a pool of devices for a specific user, such as the authenticated user (e.g., 102), at any given time. Likewise, a given user may only be authorized to provision one device of the pool 104, 106, 108 at any given time. As may be appreciated, the movements of users between devices may be difficult to track in a strong way unless an immutable, auditable manner for the specific credentials associated with the user identities, devices, etc. to be persisted is implemented.

Accordingly, the identity engine 116 may implement a blockchain 118 or similar cryptographically verifiable ledger to track credentials, such as cryptographic data, associated with users, devices, and the identity engine itself, over time. For example, the identity engine may record, as transactions in the blockchain, successful authentication attempts, failed authentication attempts, valid credentials for some or all of the involved entities over a period of time, rotations and/or other changes of such credentials, and the like. From this information, given that the credentials may be tracked to the entities to which they are associated, a chain of custody may be determined for any given device, as well as an audit trail for users of the devices. This chain of custody may be used to determine whether a given device may be provisioned to a requesting authenticating user, as well as to determine the usage, rotation, and authentication history of the various entities.

The blockchain 118 is, in some embodiments, a distributed database that comprises multiple linked, or "chained" blocks of data. At least in the case of blockchain 118, the blocks may include cryptographic information (e.g., user and device credentials), transaction information (e.g., regarding authentication attempts and provisioning attempts), rotation and/or other changes in the cryptographic information over time, and the like. The blocks and/or the individual transactions may also include a timestamp (e.g., of generation or addition of the block or associated transactions/objects), and information linking it to a previous block or object in the blockchain. This information may include, in some embodiments, a proof of work or other computational evidence reflecting integrity data and/or calculations performed by any entity attempting to add such data to the blockchain, e.g., by adding blocks of transactions during a specific period of time to the blockchain.

The proof of work is, in some embodiments, the outputted hash digest of performing a cryptographic hash function on the contents of a presumptive block to be committed, where some of the data in the block (e.g., a counter, a random number, etc.) is changed repeatedly until the resultant hash digest meets specific criteria set for acceptance of the new block into the blockchain. For example, the blockchain (or implementing system) may require, as a condition for adding a given block to the blockchain, that the hash digest of the presumptive block include a specified number of leading binary or hexadecimal zeros in the outcome, or has a value lower than a specified difficulty value. Such criteria may be tuned or otherwise set to ensure that the number of iterations required of the submitting entity is computationally large or difficult enough to make submissions, and thus back-propagated changes, sufficiently difficult (e.g., as a property of the blockchain, the header of a given block includes the proof of work outcome of the previous block, and thus a proof of work for all blocks after a given block would need to be recalculated in sequence as the resultant value of the computation of the next block would differ if the underlying data was altered after the fact).

In certain embodiments, rather than using a proof of work as a proxy for trusted addition of data to the blockchain, the blockchain 118 may be exposed to requestors, such auditors, the identity engine 116, or other customers/entities of a computing resource service provider, as a service. In such embodiments, the requestor entity provides evidence of its authority in connection with its request to directly update the blockchain 118 with new information. For example, the request may be made through an interface, such as a programmatic interface provide by or on behalf of the blockchain 118, and in some cases may include a cryptographic certificate, digital signature, cryptographic key, or some other attestation of identity or authority (e.g., associated with the identity engine 116, which may be rotated or changed on request, on a specified event, or at a specified interval). To the extent that the attestation associated with the blockchain ledger update request is sufficient to execute the update requested, the ledger implies trust and performs the update.

Note that the term "digital signature" includes any information usable to cryptographically verify authenticity of a message including information generated using an RSA-based digital scheme (such as RSA-PSS), the digital signature algorithm (DSA), the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note further that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

The blocks of the blockchain 118 may include groups of one or more sets of data as mentioned herein, as well as other data and metadata related to the event data, such as an outcome of a cryptographic hash of the other data in the block of transactions, which in some cases includes a reference to (or an outcome of) a cryptographic hash performed against the immediately preceding block of data or transactions. Accordingly, it may be appreciated that, assuming the use of a strong one-way cryptographic hash function, a post hoc change to data in an earlier block (e.g., one further down the chain) would result in a domino effect of changes to hash outcomes of each subsequent block.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

As previously mentioned, blockchains are distributed databases, and in some embodiments, each of a plurality of entities/resources responsible for maintaining the blockchain has a copy of the entirety of the blockchain at any given point (e.g., all blocks added to that point). As individual transactions and/or blocks are added to the blockchain ledger 118, information regarding those transactions (which may the added data itself) is broadcasted to all nodes/entities/resources (which, e.g., may include some or all of the computing resources used to implement the identity engine 116). As a given resource (which may be the same or different than those maintaining the blockchain) adds a block that encompasses/includes transactions over a period of time associated with that block, the contents of the new block are distributed to each node/entity/resource in the blockchain so that, eventually, the blockchain reflects a consistent state. In some embodiments, the devices 104, 106, 108 may each have a local copy of the blockchain and may make one or more provisioning determinations without an active connection to the identity engine 116.

As may be contemplated, the collection of entities/resources maintaining and/or contributing to the blockchain may be heterogeneous in nature. For example, both customer devices and resources associated with the service can participate in maintaining the blockchain, as well as participate in the computational activity (e.g., signature verification) that adds blocks to the blockchain, as the identity of the actor performing the maintenance or addition is largely irrelevant given that all other participating nodes can confirm the integrity and/or veracity of any new added block, and indeed the integrity of the entire blockchain, by simply checking performing the cryptographic hash function against the block contents (e.g., the most recent block, in the case of the entire blockchain) to see if the outcome meets that which is expected (e.g., an outcome for the same block or set of blocks at a previous point in time). Accordingly, no single actor or set of actors need be trusted as an authority with respect with the integrity of the blockchain, as any requestor may perform the relatively inexpensive computations themselves to verify the blockchain's integrity to whatever extent they desire.

Figure 2:
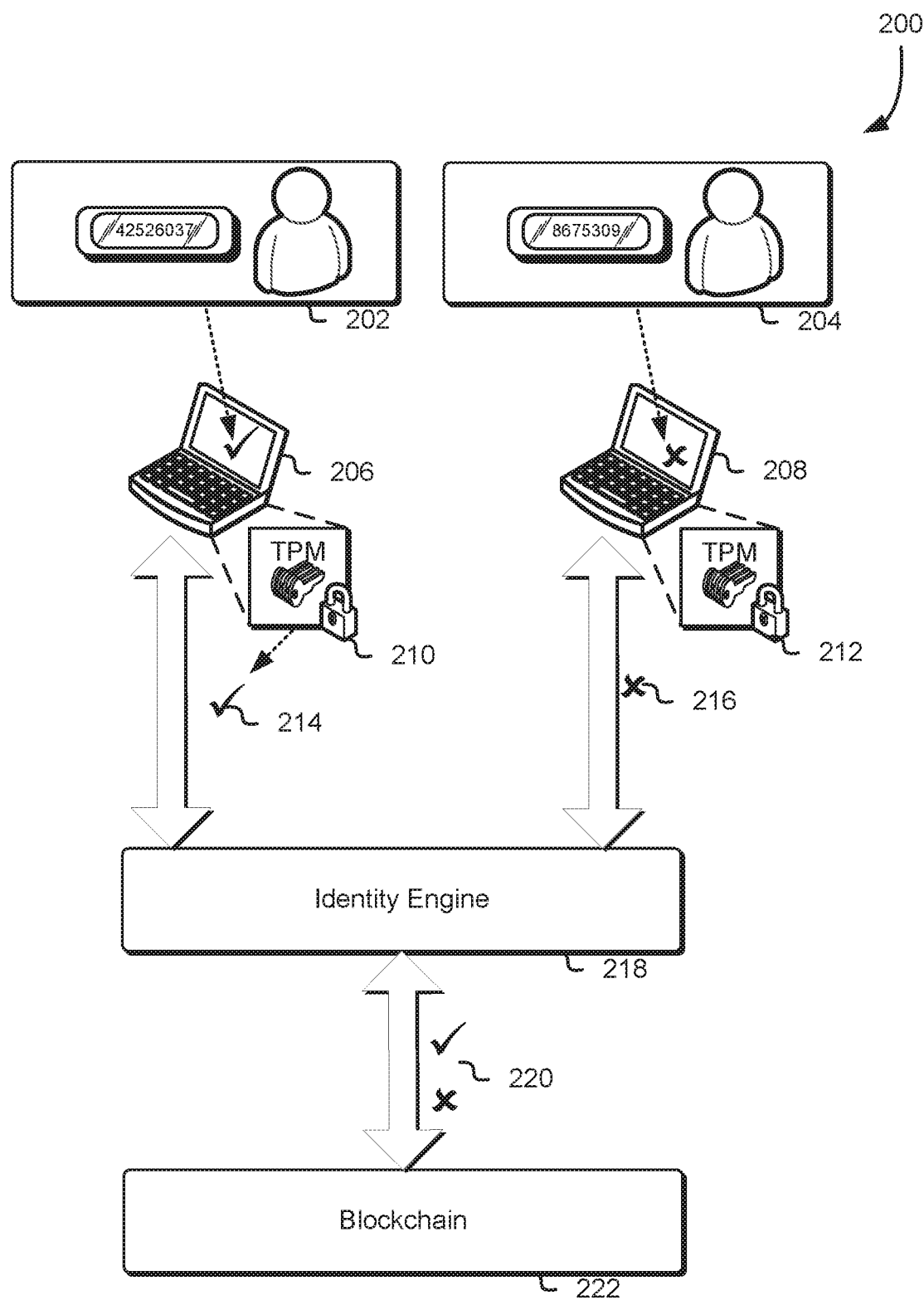
FIG. 2 illustrates an example environment in which a plurality of devices locally authenticates identities of private user entities and, using an identity engine, commits some or all of the authentication attempts to a blockchain, in accordance with some embodiments.

FIG. 2 illustrates an example environment 200 in which a plurality of devices locally authenticates identities of private user entities and, using an identity engine, commits some or all of the authentication attempts to a blockchain, in accordance with some embodiments.

The identity engine 218 may utilize the blockchain 222 for its verification and audit trail purposes in a number of ways. For example, if the device-local authentication of the login credentials are valid (e.g., user entity 202 successfully authenticates with the device 206 equipped with cryptoprocessor 210), an encrypted communication channel (e.g., using TLS/SSL, SSH, etc.) is established between the device 206 and the identity engine 218, where the identity engine provides its own credentials to provide attestation as to its authority. In some embodiments, the device 206 generates and provides credentials similarly providing an attestation as to its identity (e.g., device credentials, such as the public certificate of an asymmetric cryptographic pair as described above), as well as "wallet" credentials (e.g., user credentials, again, such as the public certificate of an asymmetric cryptographic pair). The "wallet" or user credentials may be derived from the login credentials of the authenticated user or otherwise associated with the user at one or both the local device or the identity engine.

Through this channel as established, information 214 regarding the successful device-local authentication is provided by the device 206 to the identity engine 218 for commission, as a transaction, in the blockchain 222. Such information 214 may include and/or reference the device-generated device certificates/credentials or other cryptographic information, the relevant wallet or user credentials, the login credentials (or a derivation thereof), a timestamp of the authentication attempt, the identity of the user identity, and the like.

Similarly, in some embodiments where the device 208 (having cryptoprocessor 212) is itself able to successfully communicate with the identity engine 218 (e.g., all associated device and identity engine credentials are valid as generated and/or stored and/or verified by the cryptoprocessor 212), but the user entity's 204 login credentials are invalid, the device 208 may provide information regarding the failed attempt 216 to the identity engine 218 for recordation as a transaction 220 in the blockchain. Again, such information 216, 222 may include and/or reference the device-generated device certificates/credentials or other cryptographic information, the relevant wallet or user credentials, the login credentials (or a derivation thereof), a timestamp of the authentication attempt, the identity of the user identity, reasons for the failure, and the like.

Figure 3:
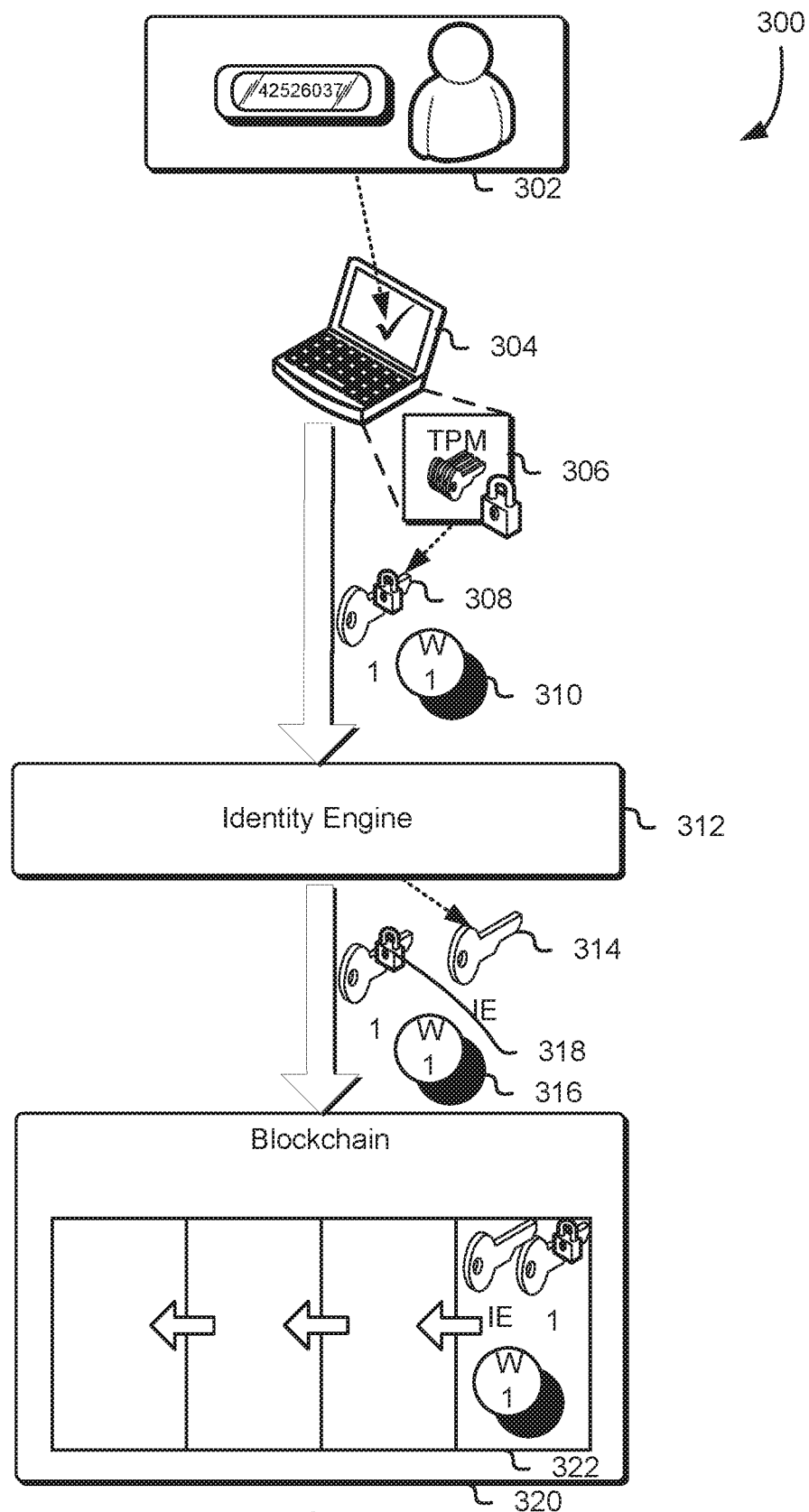
FIG. 3 illustrates an example environment in which an identity associated with a user entity successfully authenticates with a device, and the device is successfully provisioned to the user entity by a blockchain-backed identity engine, in accordance with some embodiments.

FIG. 3 illustrates an example environment 300 in which an identity associated with a user entity successfully authenticates with a device, and the device is successfully provisioned to the user entity by a blockchain-backed identity engine, in accordance with some embodiments.

As previously mentioned, the identity engine 312 may implement a blockchain 320 or similar cryptographically verifiable ledger to track credentials, such as cryptographic data, associated with users, devices, and the identity engine itself, over time. For example, the identity engine 312 may record, as transactions (e.g., 322) in the blockchain 320, successful authentication attempts, failed authentication attempts, valid credentials for some or all of the involved entities over a period of time, rotations and/or other changes of such credentials, and the like.

For example, if a user entity 302 successfully authenticates with a device 304 associated with cryptoprocessor 306, a set of device credentials 308 and a set of user credential 310 are generated, e.g., by cryptoprocessor 306 and passed to identity engine 312. Such credentials 316, 318, and credentials 314 associated with the identity engine 312 are passed to the blockchain, along with any other data or metadata associated with the authentication, and stored as a transaction 322 in the blockchain. This process occurs for each device and user entity authentication, as well as any rotations in credentials, so as to build a continuous chain of custody for each device, according to techniques described elsewhere herein.

Figure 4:
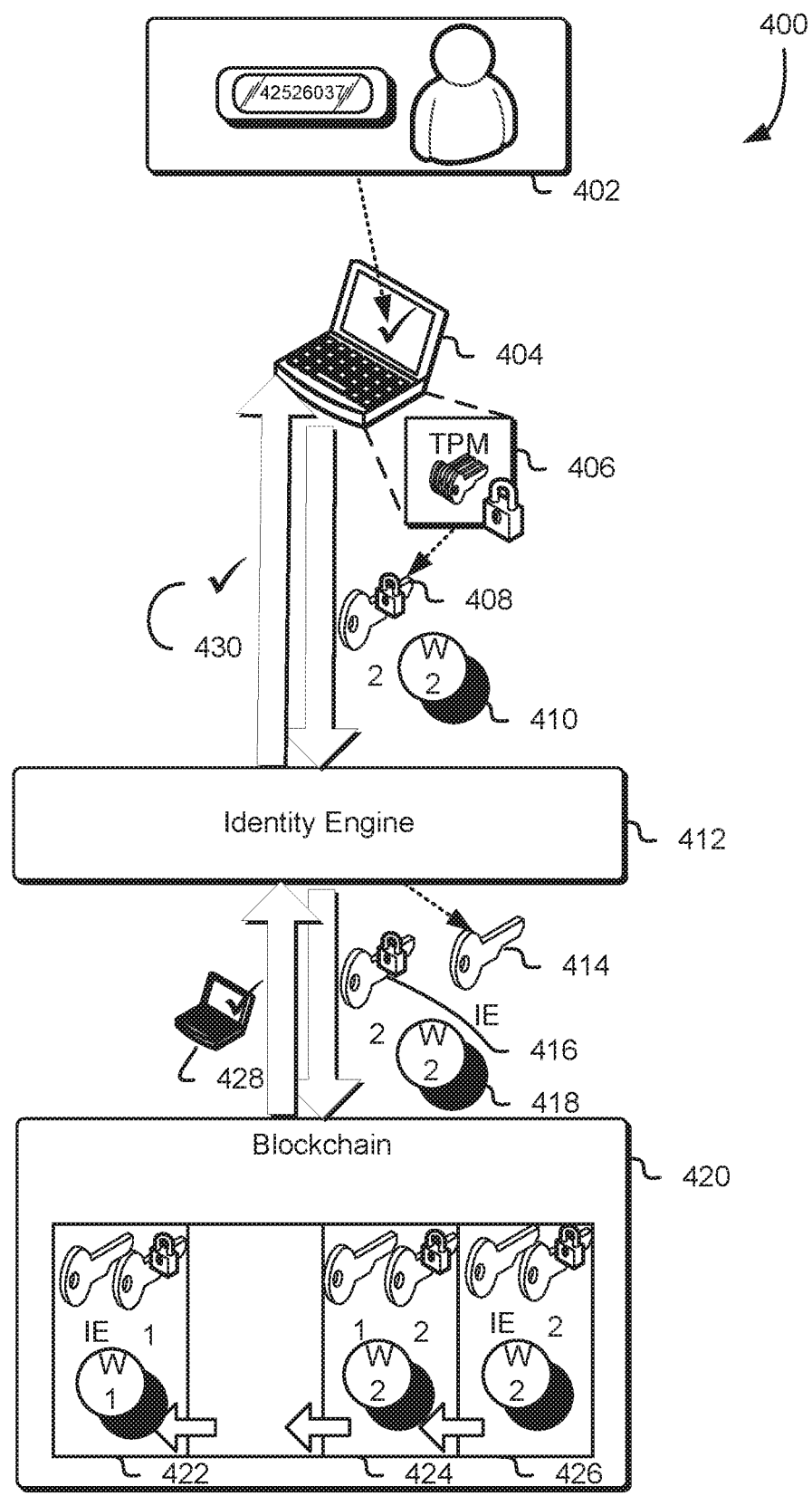
FIG. 4 illustrates an example environment in which a device is provisioned for use with an identity associated with a user identity, at least assessing a chain of custody maintained by a blockchain-backed identity engine, in accordance with some embodiments.

FIG. 4 illustrates an example environment 400 in which a device is provisioned for use with an identity associated with a user identity, at least assessing a chain of custody maintained by a blockchain-backed identity engine, in accordance with some embodiments.

As the blockchain 420 is built over time as devices connect, user entities authenticate, and credentials rotate, e.g., according to the techniques described elsewhere herein and illustrated in FIG. 3, the blockchain persists sufficient information for the identity engine 412 to generate a chain of custody for one or more of the devices 404 and utilize one or more heuristics to determine whether to grant the request and provision the device to the requesting user. For example, the identity engine 412 may verify the various credentials received from a given device requesting provisioning 404 by at least generating a chain of custody from the blockchain records (e.g., blocks 422, 424, 426) related to that device to determine if, for example, another user has already provisioned the same device (indicating that the requesting device has been spoofed), if any of the accompanying credentials have expired (e.g., rotated out), and the like.

As illustrated in FIG. 4, for example, and similarly to that described in connection with FIG. 3, a user entity 402 successfully authenticates to a device 404, thereby causing an associated cryptoprocessor 406 to generate a set of credentials 408, 410 (e.g., user credentials 410 and device credentials 408) for submission, by the device 404, to the identity engine 412. Such credentials 416, 418, as well as the identity engine credentials 414, are used by the identity engine to determine, against the chain of custody formed by the relevant blockchain transactions 422, 424, whether the provisioning request should be carried out.

As mentioned, the credentials may be rotated, e.g., at a predetermined interval or other time schedule, or they may be changed in response to an event or request (e.g., changed with each successful authentication, if a new identity is requested, and the like). When the credentials are rotated, the identity engine may record the credential changes in the blockchain. For example, a transaction may be recorded in the blockchain that includes an identification of the previous device credential, the new device credential, and the user credential associated with the then-authenticated user, as illustrated in block 424.

Thus, as illustrated, the identity engine 412 may determine that, given that the credentials 414, 416, 418 and the fact that they match the current expected credentials as verified by the chain of custody formed by blocks 422, 424, the provisioning request should be granted 428. Accordingly, the transaction (e.g., the outcome 430 of the provisioning request) is provided to the device 404, and information, including the associated credentials used to successfully provision the device 404 to the user identity 402, are recorded as a new transaction 426 in the blockchain, thereby further building the chain of custody.

Figure 5:
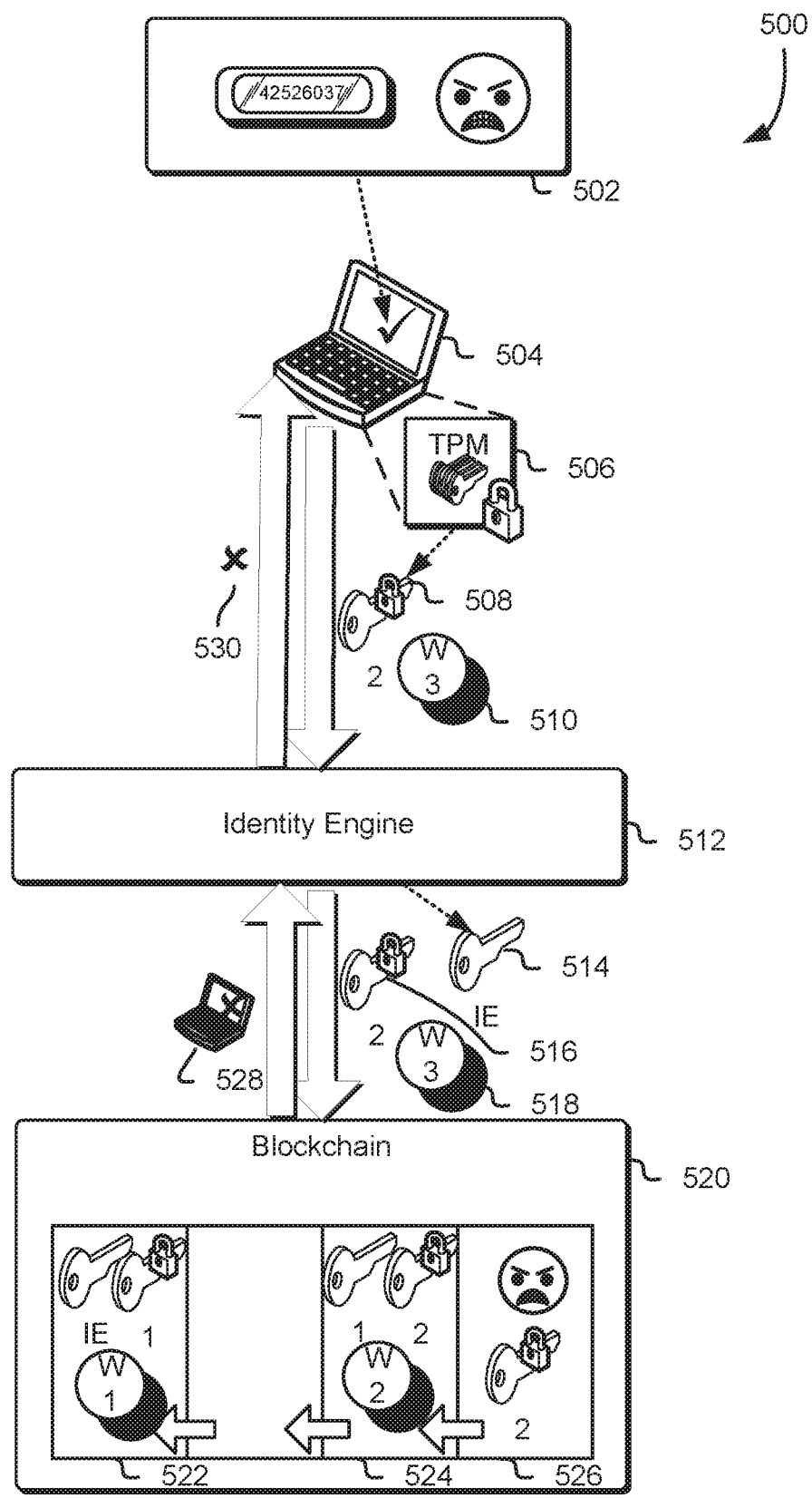
FIG. 5 illustrates an example environment in which an unauthorized or spoofed identity attempts to use and provision a device for which provisioning is controlled using a blockchain-backed identity engine, in accordance with some embodiments.

FIG. 5 illustrates an example environment 500 in which an unauthorized or spoofed identity attempts to use and provision a device for which provisioning is controlled using a blockchain-backed identity engine, in accordance with some embodiments.

Following on from FIG. 4, if, for example, another user has already provisioned the same device (indicating that the requesting device has been spoofed), if any of the accompanying credentials have expired (e.g., rotated out), or the incoming credentials do not match that which is expected based on the analysis of the chain of custody (e.g., as generated by identity engine 512 from blocks 522, 524 of the blockchain 520), a provisioning request may be denied in spite of a user entity's successful device-local authentication 504.

As illustrated, a user identity 502 successfully authenticates with a device 504. A perpetrating attacker may used misappropriated, old, and/or spoofed login credentials, a spoofed or otherwise compromised device 504, or the like, where a valid device 504 may have rotated credentials after the time they were otherwise appropriate by the attacker. As another example, the device 506 (e.g., cryptoprocessor 506) may simply have malfunctioned, and thus provide an incorrect set of credentials 508, 510. Whatever the case, the identity engine 512 generates and/or reads the chain of custody related to the alleged device 504 from the blockchain 520. As illustrated, the latest state expected for the device 504 includes a different set of credentials 524 than those presented to the identity engine 512, and thus, the identity engine 512 refuses 528, 530 provisioning of the device 504 to the user 502. In some embodiments, the credentials and other metadata 514, 516, 518 associated with the failed attempt is written to the blockchain 520 as new transaction 526 so as to extend the chain of custody, e.g., for audit purposes.

As may be contemplated, an otherwise appropriately provisioned device 504 may have its provisioning revoked according to one or more of the techniques described herein. For example, the identity engine 512 may be caused, e.g., by an administrator, and/or as a result of a security threat, to revoke existing provisioning of one or more devices 504. Such events may be recorded in the blockchain 520, and added to the chain of custody for each of the devices. The revocation of provisioning may, in certain embodiments, cause the device 504 to de-authenticate a presently authenticated user, restrict access of resources local to the device or on a network connected to the device, and the like.

Figure 6:
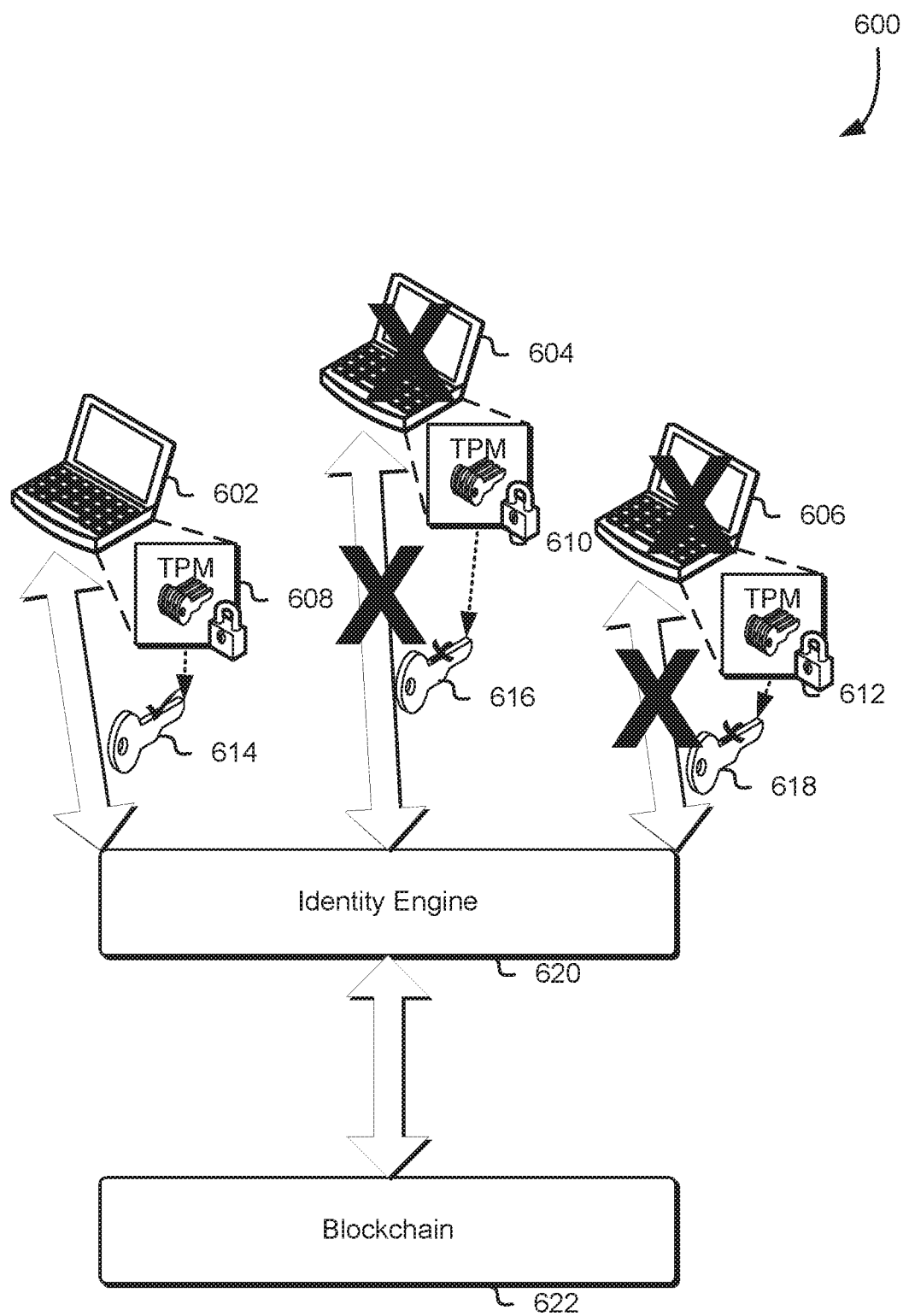
FIG. 6 illustrates an example environment in which one or more credentials associated with devices are revoked by a blockchain-based identity engine, in accordance with some embodiments.

FIG. 6 illustrates an example environment 600 in which one or more credentials associated with devices are revoked by a blockchain-based identity engine, in accordance with some embodiments.

As previously mentioned, the blockchain itself may be exposed, e.g., through a programmatic (e.g., API, web service call, etc.) or user interface, for inspection by any requesting auditing entity, such as an administrator associated with the devices, the devices themselves, or some other entity (e.g., connected with the computing resource service provider implementing the blockchain). This interface may be the same or different than the interface used by the identity engine 620 to interact with the blockchain 622.

Additionally, the credentials associated with the identity engine itself may be rotated, or revoked, etc., or the device credentials issued by cryptoprocessors 610, 612 may no longer be valid for connecting to the identity engine 620, so as to disable provisioning of any devices reliant thereupon (e.g., by refusing connection with the identity engine in the first instance). As illustrated, of the devices 602, 604, 606, an identity engine 620 may be caused (e.g., by request of an administrator or auditor) or internally decide to revoke authority from some devices 604, 606. As mentioned, the identity engine 620 may simply rotate its own credential and prevent devices 604, 606 from resynchronizing with the new rotation, or actively refuse to recognize the one or more of the credentials 616, 618 used by devices 604, 606 (e.g., as generated by respective cryptoprocessors 610, 612) as attestations for connecting to the identity engine 620. Such refusals, again, may be made manually, in response to a specific threat, as a result of a policy, at a specific interval of time, etc. Any devices (e.g., 602, 608, generating credential 614) not affected by the revocation may continue to connect with the identity engine 620 as normal.

Figure 7:
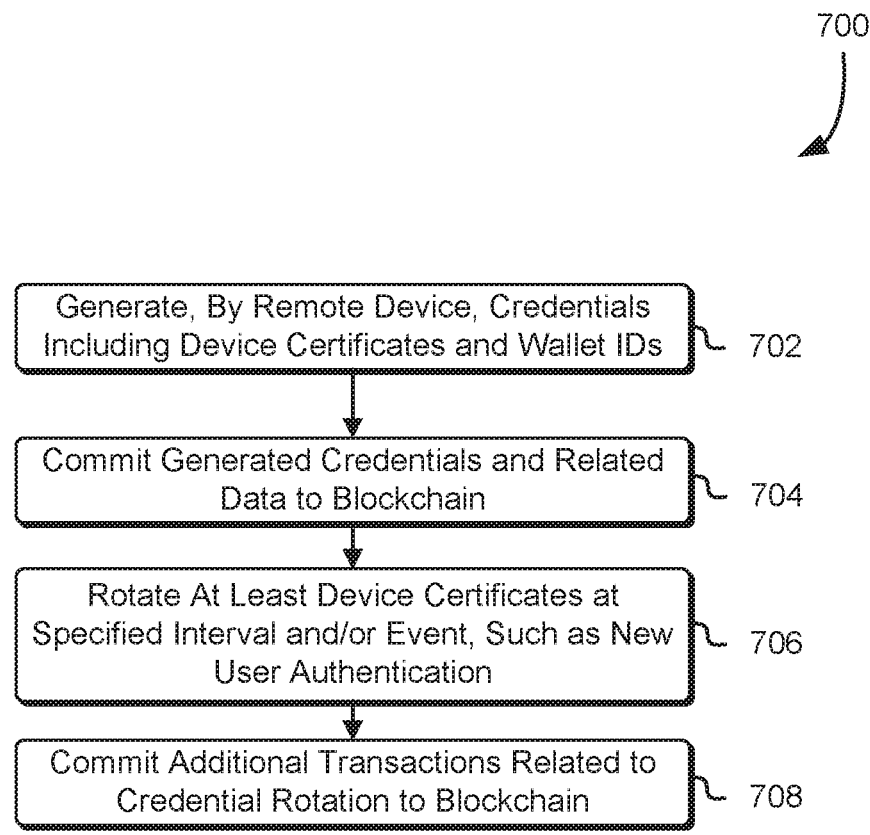
FIG. 7 illustrates an example process for using a blockchain to memorialize cryptographic materials, such as credentials related to devices and user identities, in a blockchain, in accordance with some embodiments.

FIG. 7 illustrates an example process 700 for using a blockchain to memorialize cryptographic materials, such as credentials related to devices and user identities, in a blockchain, in accordance with some embodiments.

At step 702, a remote device, such as those described above in connection with at least FIGS. 1-6, generates credentials, such as device certificates and wallet identification certificates (e.g., user certificates), in connection with provisioning devices to authenticating/authenticated user entities. The generation of such credentials may be performed by, e.g., cryptoprocessors such as trusted platform modules associated with, or integrated into, the respective devices.

At step 704, the credentials as generated in step 702 and used to attempt connection with and/or provisioning of the devices is recorded into a blockchain by, e.g., an identity engine, along with, optionally, other data associated with the generation and authentication/provisioning attempts, such as timestamps, identities, and the like. At step 706, an identity engine (or a routine associated with the devices themselves) may cause the devices and/or the identity engine to rotate their respective credentials, such as device certificates, in connection with a specific event, such as an authentication attempt or request and/or at a specified interval of time, and such changes in credentials resulting from the rotation are also recorded in the blockchain at step 708, e.g., so as to build one or more contiguous chains of custody associated with the device(s).

Figure 8:
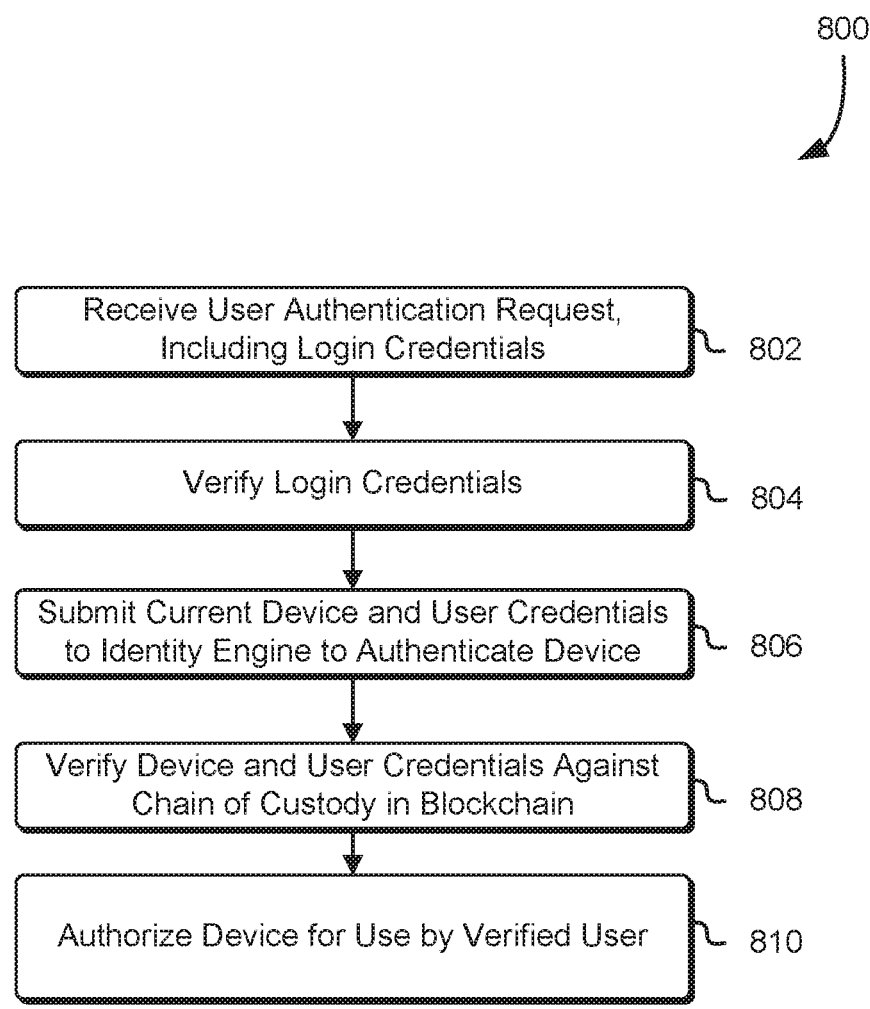
FIG. 8 illustrates an example process for authenticating users entities and devices using a blockchain-backed identity engine, in accordance with some embodiments.

FIG. 8 illustrates an example process 800 for authenticating users entities and devices using a blockchain-backed identity engine, in accordance with some embodiments.

At step 802, an entity, such as a device as previously described, receives a user authentication request, which may include login credentials, and at step 804, locally verifies the received login credentials. To the extent that the login credentials are verified, the device at step 806 submits the as-current device credentials and user credentials (e.g., wallet identification credentials), which may be generated by a cryptoprocessor of the device in connection with the login credentials, to an identity engine so as to attempt to provision the device to the authenticated user.

At step 808, the identity engine verifies the received credentials against a chain of custody associated with the device as derived from transactions (e.g., credentials and changes thereto) committed to a blockchain associated with the identity engine. The identity engine may utilize one or more heuristics to determine whether the presented credentials are as expected given the relevant chain of custody up to that point.

At step 810, if the identity engine determines that the credentials are valid given the chain of custody, the device is authorized for provisioning to the authenticated user and a record of the transaction is committed to the blockchain.

Figure 9:
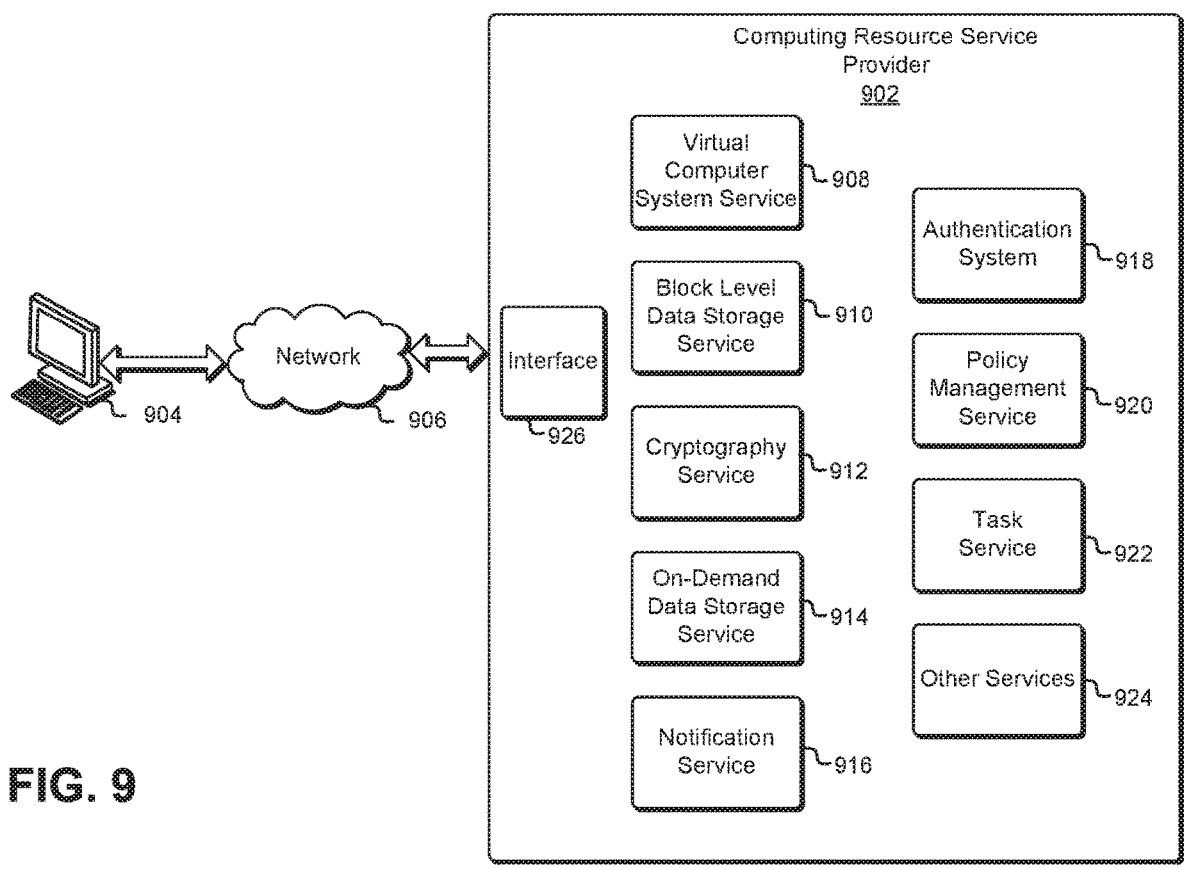
FIG. 9 shows an example of a customer connected to a computing resource service provider in accordance with at least one embodiment.

FIG. 9 shows an example of a customer connected to a computing resource service provider in accordance with at least one embodiment. The computing resource service provider 902 may provide a variety of services to the customer 904 and the customer 904 may communicate with the computing resource service provider 902 via an interface 926, which may be a web services interface or any other type of customer interface. While FIG. 9 shows one interface 926 for the services of the computing resource service provider 902, each service may have its own interface and, generally, subsets of the services may have corresponding interfaces in addition to or as an alternative to the interface 926. The customer 904 may be an organization that may utilize one or more of the services provided by the computing resource service provider 902 to maintain and deliver information to its employees, which may be located in various geographical locations. Additionally, the customer 904 may be an individual that utilizes the services of the computing resource service provider 902 to deliver content to a working group located remotely. As shown in FIG. 9, the customer 904 may communicate with the computing resource service provider 902 through a network 906, whereby the network 906 may be a communication network, such as the Internet, an intranet or an Internet service provider (ISP) network. Some communications from the customer 904 to the computing resource service provider 902 may cause the computing resource service provider 902 to operate in accordance with one or more embodiments described or a variation thereof.

The computing resource service provider 902 may provide various computing resource services to its customers. The services provided by the computing resource service provider 902, in this example, include a virtual computer system service 908, a block-level data storage service 910, a cryptography service 912, an on-demand data storage service 914, a notification service 916, an authentication system 918, a policy management service 920, a task service 922 and one or more other services 924. It is noted that not all embodiments described include the services 908-924 described with reference to FIG. 9 and additional services may be provided in addition to or as an alternative to services explicitly described. As described, each of the services 908-924 may include one or more web service interfaces that enable the customer 904 to submit appropriately configured API calls to the various services through web service requests. In addition, each of the services may include one or more service interfaces that enable the services to access each other (e.g., to enable a virtual computer system of the virtual computer system service 908 to store data in or retrieve data from the on-demand data storage service 914 and/or to access one or more block-level data storage devices provided by the block level data storage service 910).

The virtual computer system service 908 may be a collection of computing resources configured to instantiate virtual machine instances on behalf of the customer 904. The customer 904 may interact with the virtual computer system service 908 (via appropriately configured and authenticated API calls) to provision and operate virtual computer systems that are instantiated on physical computing devices hosted and operated by the computing resource service provider 902. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 908 is shown in FIG. 9, any other computer system or computer system service may be utilized in the computing resource service provider 902, such as a computer system or computer system service that does not employ virtualization or instantiation and instead provisions computing resources on dedicated or shared computers/servers and/or other physical devices.

The block-level data storage service 910 may comprise one or more computing resources that collectively operate to store data for a customer 904 using block-level storage devices (and/or virtualizations thereof). The block-level storage devices of the block-level data storage service 910 may, for instance, be operationally attached to virtual computer systems provided by the virtual computer system service 908 to serve as logical units (e.g., virtual drives) for the computer systems. A block-level storage device may enable the persistent storage of data used/generated by a corresponding virtual computer system where the virtual computer system service 908 may only provide ephemeral data storage.

The computing resource service provider 902 also includes a cryptography service 912. The cryptography service 912 may utilize one or more storage services of the computing resource service provider 902 to store keys of the customers in encrypted form, whereby the keys may be usable to decrypt the customer 904 keys accessible only to particular devices of the cryptography service 912.

The computing resource service provider 902 further includes an on-demand data storage service 914. The on-demand data storage service 914 may be a collection of computing resources configured to synchronously process requests to store and/or access data. The on-demand data storage service 914 may operate using computing resources (e.g., databases) that enable the on-demand data storage service 914 to locate and retrieve data quickly, to allow data to be provided in responses to requests for the data. For example, the on-demand data storage service 914 may maintain stored data in a manner such that, when a request for a data object is retrieved, the data object can be provided (or streaming of the data object can be initiated) in a response to the request. As noted, data stored in the on-demand data storage service 914 may be organized into data objects. The data objects may have arbitrary sizes except, perhaps, for certain constraints on size. Thus, the on-demand data storage service 914 may store numerous data objects of varying sizes. The on-demand data storage service 914 may operate as a key value store that associates data objects with identifiers of the data objects which may be used by the customer 904 to retrieve or perform other operations in connection with the data objects stored by the on-demand data storage service 914.

In the environment illustrated in FIG. 9, a notification service 916 is included. The notification service 916 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 916 may provide notifications to clients using a "push" mechanism without the need to periodically check or "poll" for new information and updates. The notification service 916 may further be used for various purposes such as monitoring applications executing in the virtual computer system service 908, workflow systems, time-sensitive information updates, mobile applications, and many others.

As illustrated in FIG. 9, the computing resource service provider 902, in various embodiments, includes an authentication system 918 and a policy management service 920. The authentication system 918, in an embodiment, is a computer system (i.e., collection of computing resources) configured to perform operations involved in authentication of users of the customer. For instance, one of the services 908-916 and 920-924 may provide information from a user to the authentication system 918 to receive information in return that indicates whether the user requests are authentic.

The policy management service 920, in an embodiment, is a computer system configured to manage policies on behalf of customers (such as customer 904) of the computing resource service provider 902. The policy management service 920 may include an interface that enables customers to submit requests related to the management of policy. Such requests may be, for instance, requests to add, delete, change, or otherwise modify policy for a customer or for other administrative actions, such as providing an inventory of existing policies and the like.

The computing resource service provider 902, in various embodiments, is also equipped with a task service 922. The task service 922 is configured to receive a task package from the customer 904 and enable executing tasks as dictated by the task package. The task service 922 may be configured to use any resource of the computing resource service provider 902, such as one or more instantiated virtual machines or virtual hosts, for executing the task. The task service 922 may configure the one or more instantiated virtual machines or virtual hosts to operate using a selected operating system and/or a selected execution application in accordance with a requirement of the customer 904.

The computing resource service provider 902 additionally maintains one or more other services 924 based at least in part on the needs of its customers 904. For instance, the computing resource service provider 902 may maintain a database service for its customers 904. A database service may be a collection of computing resources that collectively operate to run one or more databases for one or more customers 904. The customer 904 may operate and manage a database from the database service by utilizing appropriately configured API calls. This, in turn, may allow a customer 904 to maintain and potentially scale the operations in the database. Other services include, but are not limited to, object-level archival data storage services, services that manage and/or monitor other services.

Figure 10:
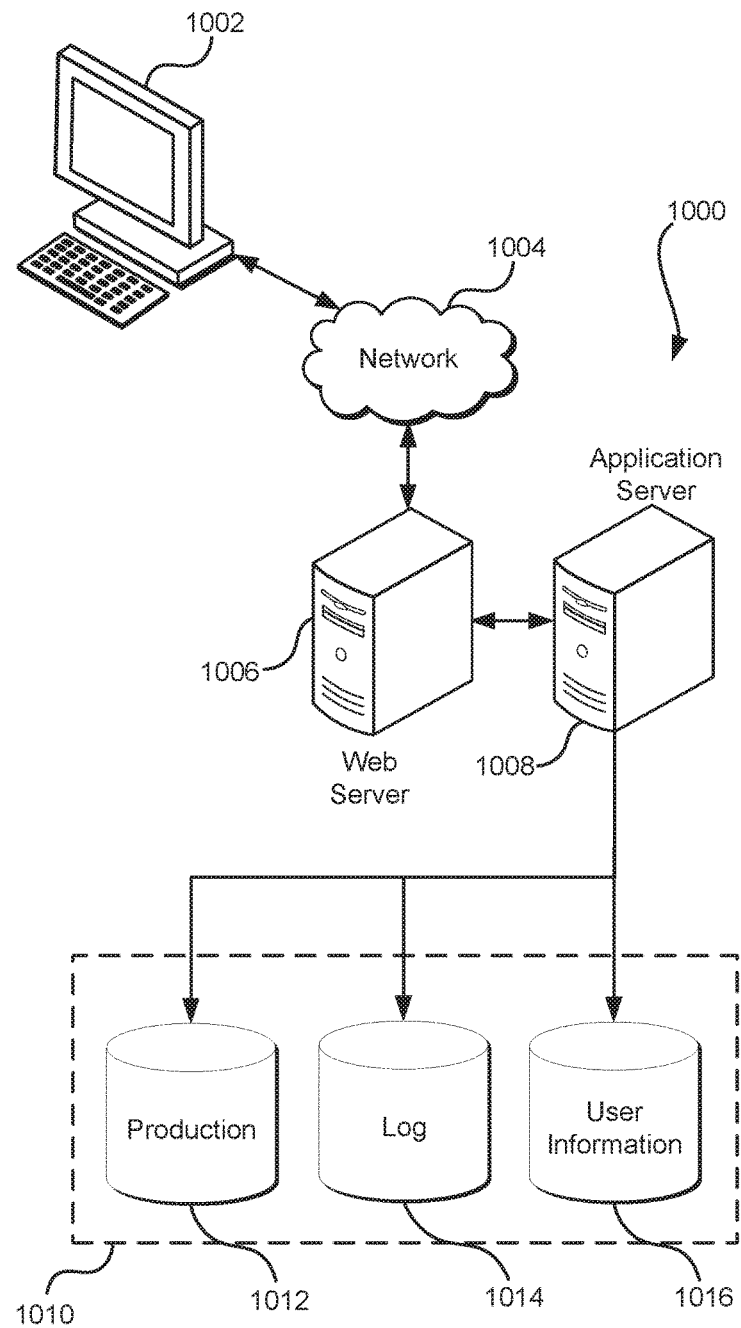
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language.

Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and$^{IBM}$® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
  generating, by a cryptoprocessor of a device associated with an identity engine, a first set of device credentials based at least in part on cryptographic information maintained by the cryptoprocessor;
  authenticating, by the device in connection with a user authentication request, an identity of a user entity associated with the user authentication request;
  generating, by the device in connection with authenticating the identity of the user entity, a first set of user credentials;
  rotating the first set of user credentials by at least generating, by the cryptoprocessor of the device associated with the identity engine, a second set of user credentials;
  committing a first transaction to a blockchain, the first transaction including information identifying the first set of device credentials and the second set of user credentials; and
  provisioning, by the identity engine, the device for the user entity, by at least:
    traversing the blockchain to determine a chain of custody associated with the device; the chain of custody at least including a plurality of user credentials and a plurality of device credentials generated by the device as a result of at least rotating valid credentials;
    validating, based at least in part on the chain of custody, the second set of user credentials and the first set of device credentials; and
    as a result of validating the second set of user credentials and the first set of device credentials, committing a second transaction associated with the validating to the blockchain.

2. The computer-implemented method of claim 1, wherein the second transaction includes information identifying at least the second set of user credentials and the first set of device credentials.

3. The computer-implemented method of claim 1, wherein rotating the first set of user credentials further comprises generating, by the cryptoprocessor of the device, a second set of device credentials.

4. The computer-implemented method of claim 3, wherein committing the first transaction to the blockchain further comprises committing the second set of device credentials.

5. A system, comprising:
  at least one computing device, including one or more processors, that implement one or more services, wherein the one or more services at least:
    process a provisioning request associated with a remote device by at least:
      receiving a first set of device credentials and a first set of user credentials, the first set of device credentials generated by a cryptoprocessor of the remote device based at least in part on a secret maintained by the cryptoprocessor;
      determining, based at least in part on one or more records stored in a blockchain, a chain of custody associated with the remote device, the chain of custody at least including information associated with a plurality of user credentials and a plurality of device credentials;
      processing, using at least the chain of custody, the first set of device credentials and the first set of user credentials to determine an outcome of the provisioning request;
      returning the outcome in response to the provisioning request;
      receiving a request to rotate the first set of user credentials, including a second set of user credentials generated by the cryptoprocessor of the remote device based at least in part on the secret maintained by the cryptoprocessor; and
      processing the request by at least validating, based at least in part on the chain of custody, the second set of user credentials and the first set of device credentials and, as a result, committing to the blockchain the second set of user credentials.

6. The system of claim 5, wherein the one or more services further commit an additional record to the blockchain in connection with the outcome.

7. The system of claim 6, wherein the additional record includes the first set of device credentials and the first set of user credentials.

8. The system of claim 5, wherein the one or more services further cause the remote device to replace the first set of device credentials with the second set of device credentials after a specified interval of time by at least causing the remote device to transmit the request to rotate the first set of user credentials.

9. The system of claim 5, wherein the one or more services further cause the remote device to replace the first set of user credentials with the second set of user credentials in connection with the outcome.

10. The system of claim 5, wherein the first set of user credentials is generated by the cryptoprocessor of the remote device in connection with an attempt by a user entity to authenticate an associated identity with the remote device.

11. The system of claim 5, wherein the blockchain stores the one or more records as a result of a credential associated with the one or more services.

12. The system of claim 5, wherein the provisioning request is received from the remote device.

13. A non-transitory computer-readable storage medium storing thereon executable instructions that, as a result of being executed by one or more processors of a computer system, cause the computer system to at least:
  provide, to an identity engine, a transaction to commit to a blockchain, the transaction including a first set of user credentials generated by a first result of a first cryptographic operation performed by a cryptoprocessor of the computer system based at least in part on a first set of login credentials and a first set of device credentials associated with the computer system, the transaction generated as a result of rotating credentials associated with the computer system;
  receive a request from a user entity to authenticate an associated identity;
  verify the first set of login credentials associated with the request; and
  as a result of verifying the first set of login credentials, at least:
    generate, based at least in part on the first set of login credentials, the first set of user credentials;
    submit at least a portion of the first set of user credentials and at least a portion of the first set of device credentials to the identity engine, so as to cause the identity engine to verify, using one or more transactions, including the transaction, stored in the blockchain, the first set of user credentials and the first set of device credentials and to cause the identity engine to generate, from the one or more transactions stored in the blockchain, a chain of custody associated with the computer system, the chain of custody including a plurality of user credentials and a plurality of device credentials associated with the computer system;

receive an outcome of the verification; and authorize the computer system to be associated with the user entity in connection with the outcome.

14. The non-transitory computer-readable storage medium of claim 13, wherein the first set of login credentials includes at least multifactor authentication credentials.

15. The non-transitory computer-readable storage medium of claim 13, wherein the instructions that cause the computer system to generate the first set of user credentials further include instructions that cause the computer system to generate a private user credential and a public user credential.

16. The non-transitory computer-readable storage medium of claim 15, wherein the portion of the first set of user credentials excludes the private user credential.

17. The non-transitory computer-readable storage medium of claim 13, wherein the outcome is persisted by the identity engine in the blockchain.

18. The non-transitory computer-readable storage medium of claim 17, wherein the request is received at least in part via a user interface provided by the computer system.

19. The non-transitory computer-readable storage medium of claim 17, wherein the request is a programmatic request.

20. The non-transitory computer-readable storage medium of claim 13, wherein the plurality of user credentials and the plurality of device credentials are included in the one or more transactions as a result of rotating the credentials associated with the computer system.

* * * * *